Patented Dec. 11, 1923.

1,476,934

UNITED STATES PATENT OFFICE.

ERNEST H. VOLWILER, OF CHICAGO, AND ROGER ADAMS, OF URBANA, ILLINOIS, ASSIGNORS TO THE ABBOTT LABORATORIES, OF CHICAGO, ILLINOIS, A CORPORATION OF ILLINOIS.

ANÆSTHETIC COMPOUND.

No Drawing.   Application filed February 13, 1922. Serial No. 536,362.

*To all whom it may concern:*

Be it known that we, ERNEST H. VOLWILER and ROGER ADAMS, residing at Chicago, in the county of Cook and State of Illinois, and at Urbana, in the county of Champaign and State of Illinois, both citizens of the United States of America, have invented certain new and useful Improvements in Anæsthetic Compounds, of which the following is a specification.

Our invention relates to the production of anæsthetic compounds, and refers particularly to the production of alkyl allyl amino alcohol esters of aromatic acids containing a benzene ring of the general formula,

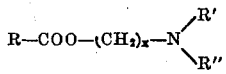

in which R represents a benzene ring or substituted benzene ring, $x$ represents two or more, R' represents an alkyl group greater than ethyl, and R'' represents an allyl group.

This invention has for its object the production of improved compounds having valuable anæsthetic properties.

*General method of synthesizing compounds of this series.*

An ω-halogen alkyl benzoate or ring substituted ω-halogen alkyl benzoate is warmed with an alkyl allyl amine. The reaction mixture is treated with water and benzene, and the benzene layer extracted with dilute hydrochloric acid. Upon neutralizing this solution with sodium hydroxide, the alkyl allyl amino alcohol ester of the aromatic acid used is precipitated out; this compound may then be neutralized with acids to obtain the salts.

An alternative method which may be used consists of first preparing the required alkyl allyl amino alcohol by condensing an alkyl allyl amine with a polymethylene halohydrin or a polymethylene oxide, and then condensing the amino alcohol thus obtained with the aromatic acid chloride.

*Specific compounds.*

A specific compound belonging to the general series as above defined is the γ-n-butyl allyl amino propyl alcohol ester of para amino benzoic acid. This compound may be prepared by the general process described above. One mole of γ-bromopropyl p-nitro benzoate is mixed with two moles of n-butyl allyl amine and heated to about 60° for three hours. The n-butyl allyl amine, which has not previously been described in the literature, is readily prepared by the action of n-butyl bromide on allyl amine, and boils at 132°–133° at 746 mm. To the reaction mixture is added water and benzene and the layers are separated. The benzene layer is extracted with dilute hydrochloric acid, and the aqueous layer treated with tin and, if necessary, more hydrochloric acid. The temperature should be kept at about 50° C. so as to prevent hydrolysis so far as possible.

The temperature is maintained at 50° C. for an hour, the solution poured from the excess tin, diluted with water, and the tin in solution precipitated by hydrogen sulfide. Upon filtering off the tin sulfide, and making the solution alkaline, the γ-n-butyl allyl amino propyl alcohol ester of p-amino benzoic acid separates out. This is extracted and then neutralized with hydrochloric acid. In this way, the mono-hydrochloride is produced, which crystallizes from acetone in white crystals, melting at 147° C. Other salts may be produced by neutralizing the base with other acids.

The above compound produces profound anesthesia of the mucous membrane, and has properties resembling those of cocaine.

Another specific compound belonging to this series is the β-n-butyl allyl amino ethyl alcohol ester of p-amino benzoic acid. It may be prepared by a method analogous to that already described. One mole of β-brom ethyl p-nitro benzoate and two moles of n-butyl allyl amine are heated together to form the hydrobromide of the β-n-butyl amino ethyl ester of p-nitro benzoic acid. The latter compound is reduced with tin and hydrochloric acid in the manner already described. The hydrochloride of the resulting β-n-butyl allyl amino ethyl ester of p-amino benzoic acid is a white crystalline solid melting at 184° C.

The n-propyl allyl amino propyl alcohol ester and the iso-propyl allyl amino propyl alcohol ester of p-amino benzoic acid may be prepared in an exactly analogous manner to the preparation of the compounds already described. Their hydrochlorides are viscous oils which are difficult to crystallize.

The iso-amyl allyl amino ethyl alcohol ester of p-amino benzoic acid may be prepared by condensing iso-amyl allyl amino ethyl alcohol (made by heating together equimolecular amounts of iso-amyl allyl amine and ethylene oxide at 60°, it boils at 132°–133° at 55 mm.) with p-nitro benzoyl chloride in benzene solution, and then reducing with tin and hydrochloric acid in the usual manner. The anæsthetic base thus obtained is dissolved in absolute ether, and dry hydrochloric acid gas is passed in. The solid dihydrochloride which separates may be purified by recrystallization from alcohol. It melts at 194°–195°.

The alkyl allyl amino alcohol esters of the aromatic acids containing a benzene nucleus are either liquid compounds or low-melting solids, insoluble in water, but readily soluble in ether, benzene, etc. All of these bases, as well as their salts, possess anæsthetic properties. When heated with an aqueous solution of an alkali, they are decomposed to alkyl allyl amino alcohols and salts of aryl acids.

The scope of the invention is determined by the terms of the appended claims, which should be interpreted as broadly as possible consistent with the state of the art.

We claim as our invention:

1. As a new article of manufacture, alkyl allyl amino alcohol ester of an aromatic acid, containing a benzene nucleus, and of the general formula:

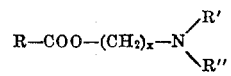

in which R represents a benzene nucleus, $x$ represents more than one, R′ represents an alkyl group greater than ethyl, and R″ represents an allyl group.

2. As a new article of manufacture, alkyl allyl amino alcohol ester of p-amino benzoic acid of the general formula:

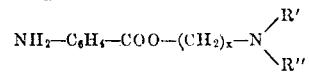

in which $x$ represents two or more, R′ represents an alkyl group greater than ethyl and R″ represents an allyl group.

3. As a new article of manufacture the alkyl allyl amino alcohol ester of an aromatic acid containing a benzene nucleus, and having the general formula:

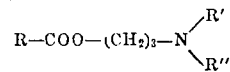

in which R represents a benzene nucleus, R′ represents an alkyl group greater than ethyl and R″ represents an allyl group.

4. As a new article of manufacture, the alkyl allyl amino alcohol ester of an aromatic acid containing a benzene nucleus of the general formula:

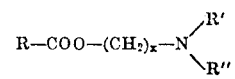

in which R represents a benzene nucleus, $x$ represents more than one, R′ represents an n-butyl group and R″ represents an allyl group.

5. As a new article of manufacture the n-butyl allyl amino alcohol ester of p-amino benzoic acid.

6. As a new article of manufacture, the n-butyl allyl amino propyl ester of an aromatic acid containing a benzene nucleus.

7. As a new, anæsthetic compound the gamma n-butyl allyl amino propyl ester of p-amino benzoic acid which is a low melting solid forming a hydrochlorid melting at 147° C.

ERNEST H. VOLWILER.
ROGER ADAMS.